No. 725,843. PATENTED APR. 21, 1903.
W. HENN, Jr.
BICYCLE BRUSH.
APPLICATION FILED JUNE 10, 1902.
NO MODEL.
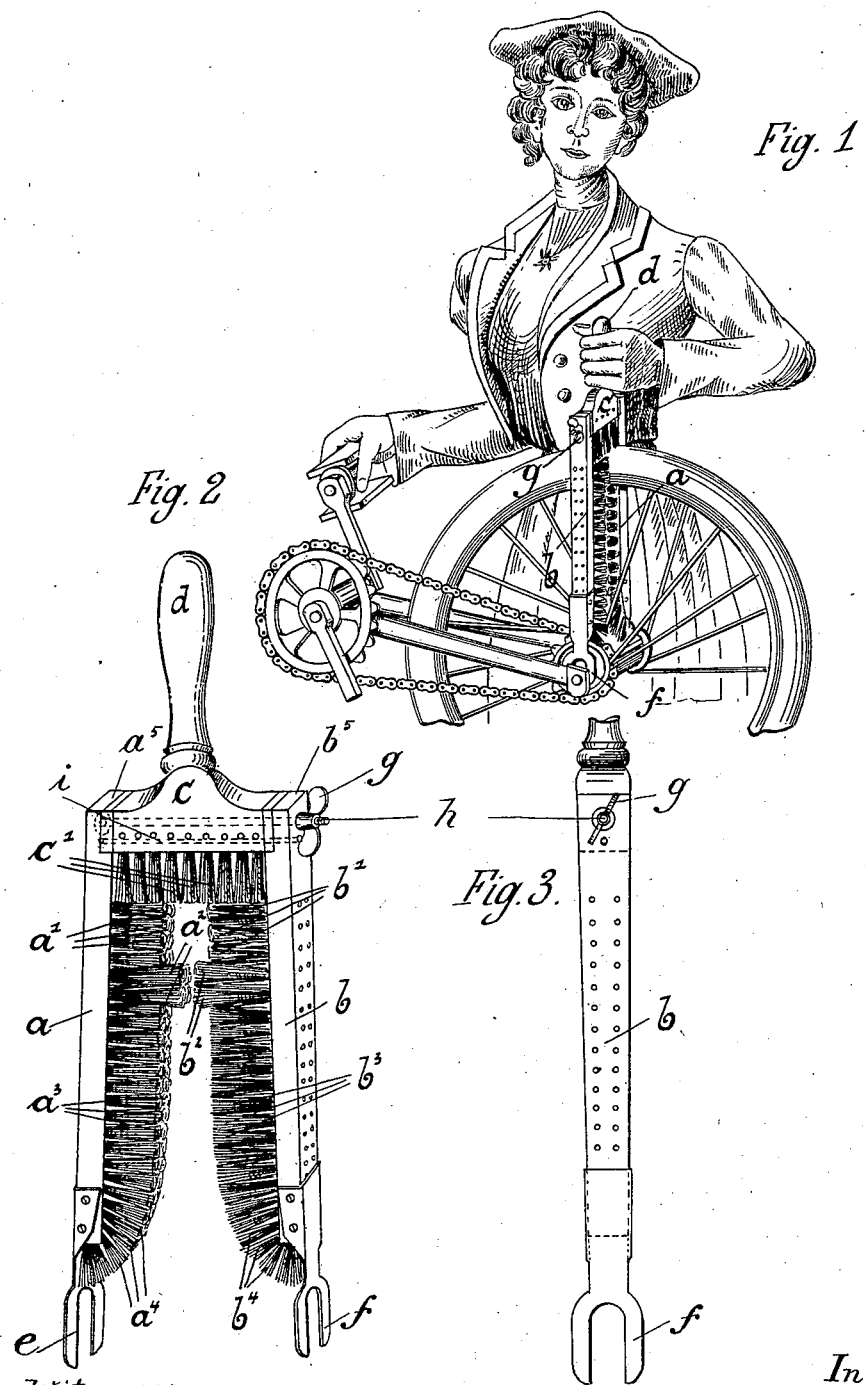

UNITED STATES PATENT OFFICE.

WILHELM HENN, JR., OF BRETTEN, GERMANY.

BICYCLE-BRUSH.

SPECIFICATION forming part of Letters Patent No. 725,843, dated April 21, 1903.

Application filed June 10, 1902. Serial No. 111,029. (No model.)

*To all whom it may concern:*

Be it known that I, WILHELM HENN, Jr., merchant, a citizen of the German Empire, residing at the town of Bretten, in the Grand Duchy of Baden, Germany, have invented a new and useful Bicycle-Brush or Appliance for the Cleansing of Bicycles, of which the following is a specification.

The subject of the present invention is a brushwork implement by means of which a bicycle can be thoroughly, quickly, and easily cleansed.

Heretofore the cleansing of the principal parts of a bicycle—as the surfaces outward, sideward, and inward of the tires and wheels, the spokes and hub, and fixings—has been effected by the use of various brushes which must be taken one after another, but by means of my bicycle-brush all the parts named are handled at once. With this single implement, with the utmost expedition and most conveniently, a bicycle is completely cleansed at such a small expenditure of time as to scarcely deserve mention.

In the accompanying drawings my bicycle-brush is represented in three figures:

Figure 1 gives a disposition of the same; Fig. 2, a front view, and Fig. 3 a side view.

The main features of the brush are the two long forks or legs $a$ and $b$, standing opposed to each other and set on the opposing inner sides with long brushes composed of hog's bristles of unequal length. They are firmly united at the top end by a cross-brush $c$, which runs up into a handle $d$. The cross-brush $c^2$ is intended to cleanse the outer surface of the tire, the brushes at $a'$ and $b'$ on the legs $a$ and $b$ to cleanse the side surfaces of the wheel, the brushes at $a^2$ and $b^2$ the rim, the brushes at $a^3$ and $b^3$ the spokes, and the brushes at $a^4$ and $b^4$ the nave. At each bottom end of the legs $a$ and $b$ is fixed a metal fork $e$ and $f$. These forks being placed over and on the projecting parts of the axle serve to steady and thus give the bicycle-brush a good purchase while it is being used. An interchangeable connection of the parts $a$, $b$, and $c$ is effected by the employment of a headed screw $h$, having a thumb-nut $g$, which screws all three parts together. To aid in making this connection extremely stable, the parts $a$ and $b$ at the place of junction $a^5 b^5$ are traversed by an adjusting-pin $i$.

To use the bicycle-brush, it is only needful to place it over the bicycle in the way shown in Fig. 1, setting the bottom end forks upon the projecting parts of the axle, then to push the bicycle backward and forward a few times.

What I claim as my invention, and desire to secure by Letters Patent, is—

In a bicycle-brush, two legs provided with bristles and metal forks secured to the lower ends of said legs adapted to ride on the ends of a bicycle-hub when in use.

In testimony whereof I have signed my name to this specification in the presence of two subscribing witnesses.

WILHELM HENN, JUNIOR.

Witnesses:
   H. W. HARRIS,
   J. ADRIAN.